United States Patent [19]

Goscenski, Jr. et al.

[11] 4,265,143

[45] May 5, 1981

[54] LATCH MECHANISM FOR LOCKING DIFFERENTIAL

[75] Inventors: Edward J. Goscenski, Jr., Battle Creek; Phillip E. Konkle, Albion, both of Mich.

[73] Assignee: Eaton Corporation, Cleveland, Ohio

[21] Appl. No.: 22,662

[22] Filed: Mar. 22, 1979

[51] Int. Cl.³ .......................... F16H 1/44; F16H 1/40
[52] U.S. Cl. ...................................... 74/710.5; 74/713
[58] Field of Search ....................... 74/710.5, 711, 713

[56] References Cited

U.S. PATENT DOCUMENTS

| Re. 28,004 | 5/1974 | Ottemann | 74/711 |
|---|---|---|---|
| 2,387,031 | 10/1945 | Tourneau | 74/316 |
| 3,606,803 | 9/1971 | Ottemann | 74/711 |
| 3,818,781 | 6/1974 | Goscenski, Jr. | 74/711 |
| 3,831,462 | 8/1974 | Baremor | 74/711 |
| 3,845,672 | 11/1974 | Goscenski, Jr. | 74/711 |
| 3,893,351 | 7/1975 | Baremor | 74/711 |
| 3,938,408 | 2/1976 | Baremor | 74/711 |
| 3,985,045 | 10/1976 | Shilling et al. | 74/711 |

FOREIGN PATENT DOCUMENTS 1063906  8/1959  Fed. Rep. of Germany .......... 74/710.5

*Primary Examiner*—Leslie Braun

*Attorney, Agent, or Firm*—R. J. McCloskey; J. Yakimow; L. Kasper

[57] ABSTRACT

A differential gear mechanism of the limited slip type is provided, and includes a mechanism for locking up the differential gear set, and a mechanism for actuating the lockup mechanism. The actuating mechanism includes a flyweight mechanism (71) and a latch mechanism (111). The latch mechanism includes a latch member (115) defining a pair of latch surfaces (125 and 127). The latch mechanism further includes a frame member (113) and a weighted member (117) which is oppositely disposed from the latch member about the axis of rotation of the differential gear set. The weighted member is operable to move the latch mechanism, in opposition to the biasing force of a spring (123), along a straight, generally diametrally-oriented path, in response to increasing rotational speed of the differential gear mechanism. Such movement causes movement of the latch member from an operative position (FIGS. 4 and 5) to an inoperative position (FIG. 8), in which the latch member is incapable of engaging either of the flyweights to prevent rotation of the flyweight mechanism. The position and mode of operation of the weighted member is effective to reduce missed engagements of the actuating mechanism.

12 Claims, 8 Drawing Figures

LATCH MECHANISM FOR LOCKING DIFFERENTIAL

BACKGROUND OF THE DISCLOSURE

The present invention relates generally to differential mechanisms, and more particularly, to such mechanisms of the type commonly referred to as "locking differentials".

Differential gear mechanisms of the type to which the present invention applies are broadly referred to as "limited slip differentials"0 and typically include a clutch pack which is operable to limit or retard differentiating action between the output gears (side gears). More specifically, however, the present invention is intended for use on limited slip differentials of the type referred to as "locking differentials", and will be described in connection therewith. In a locking differential, means are provided for engaging or locking the clutch set, rather than permitting it to slip, to substantially reduce the amount of differentiating action permitted between the side gears.

Locking differentials of various types are now generally well known in the art, including both interaxle lockers, and inter-wheel lockers. Inter-wheel locking differentials may be applied either to conventional rear-wheel drive vehicles, or to the more recent front-wheel drive vehicles. Although the present invention may be utilized to advantage in any of the above-described types of locking differential, it is especially advantageous when applied to an inter-wheel, front-wheel drive vehicle, and will be described in connection therewith.

As is now quite well known to those involved in the design of front-wheel drive vehicles, especially the "compact" and "subcompact" automobiles, one of the major problems involves the limited amount of space available for the various engine and drive train components and accessories. The lack of space becomes especially difficult in the case of a component which is "optional" to the vehicle purchaser, and which is larger than the standard component being replaced. Such is the case with a locking differential replacing a conventional, open differential.

In a locking differential, the space problem is compounded by the dimensional limitations imposed in regard to both the axial length and the gear case outside diameter. For example, the location of adjacent drive train components and accessories may result in a specified maximum case diameter, over at least a major portion of the axial extent of the locking differential. In prior art locking differentials of the type illustrated in U.S. Pat. No. Re.28,004, assigned to the assignee of the present invention, there is included a lockup means for locking up the differential gear set, and an actuating means for actuating the lockup means. The actuating means includes a rotatable flyweight mechanism and a latch mechanism which is movable between an operative position and an inoperative position. In the operative position, the latch mechanism engages the flyweight mechanism to prevent rotation thereof and actuate the lockup means, and in the inoperative position, the latch mechanism is incapable of engaging the flyweights. Typically, the inoperative position occurs when the rotational speed of the differential gear case exceeds a predetermined limit. Normally, with no differentiation occurring between the side gears, the vehicle speed is a direct function of the gear case rotational speed.

As is well known to those skilled the art, the performance of an actuating means of the type to which the present invention applies can be improved by increasing the size of the flyweight mechanism, and by increasing the weight of the latch mechanism. However, in prior art locking differentials, the flyweight mechanism and the latch mechanism have been disposed circumferentially adjacent each other, and in a locking differential for a front-wheel drive vehicle, requiring a reduced case diameter, there would be insufficient space to utilize the prior art arrangement, with the flyweight and latch mechanisms adjacent each other, unless the size and weight of the mechanisms would be reduced, which would adversely effect the performance.

Accordingly, it is an object of the present invention to provide a differential gear mechanism of the locking differential type which makes it possible to reduce the gear case diameter without the need to reduce the size of the flyweight mechanism or the weight of the latch mechanism.

It is a more specific object of the present invention to provide a locking differential in which the flyweight mechanism and latch mechanism are not disposed circumferentially adjacent each other.

It is another object of the present invention to provide a locking differential mechanism which accomplishes the above-stated objects, without increasing the axial length of the differential gear mechanism.

Performance of a locking differential, and more specifically, of the flyweight and latch mechanisms, is evaluated primarily in terms of "missed engagements," i.e., the number of times that one of the wheels "spins out" or accelerates, without the latch mechanism engaging the flyweight mechanism to initiate locking of the differential gear set. One of the primary causes of missed engagement is the effect of gravity on the weighted portion of the latch mechanism. For example, if the latch mechanism is designed not to engage at case rotational speeds above 200 rpm, the actual maximum engagement speed will vary depending upon the rotational orientation of the differential case at the instant the flyweights move to the extended position. A graph of case rotational speed (maximum speed at which engagement can occur) versus rotational orientation is shaped generally like a sine wave, with the amplitude of the curve indicating the relative effect of gravity on the operation of the latch mechanism. This sine wave may also be considered as a graph of case speed above which lockout of the latch mechanism (i.e., movement of the latch mechanism to an inoperative position) will occur, and therefore, will be referred to hereinafter, for simplicity, as the "lockout" curve. Using the example above, with a case speed of 200 rpm being the selected maximum "lockout" speed, it will next be assumed for purposes of explanation that the locking differential encounters a "spin out" condition, such that one side gear rotates at 0 rpm, and the other side gear begins to accelerate.

If the flyweights are designed to move to the extended position at 100 rpm difference between the side gears, no engagement can occur at case speeds below 50 rpm (the average of the side gear speeds). A line may then be placed on the above-mentioned graph at the 50 rpm level. Evaluation of this graph indicates that engagement will not occur at case speeds above the "lockout" curve, nor below the 50 rpm line. If the "lockout"

curve dips below the 50 rpm line, over a range of case orientations, the indicated result is that engagement cannot occur within that particular range of rotational orientations, resulting in a spin out or acceleration. Therefore, in designing a flyweight mechanism and latch mechanism for a locking differential, it is one objective of those skilled in the art to reduce the amplitude of the above-described "lockout" curve, thus reducing the range of case orientations in which a misses engagement can occur.

The attempts to reduce the amplitude of the engagement curve are related to the previously-described size and space problems involved in the design of locking differentials for front-wheel drive vehicles. It has been found that the amplitude of the lockout curve is related to the geometry of the latch mechanism, and more specifically, to the center of gravity (CG) of the weighted portion of the latch mechanism. One of the factors involved in the radius (R), i.e., the distance from the axis of rotation of the differential to the CG of the weight, when the latch mechanism is in the operative position, i.e., the position in which engagement of the flyweights can occur. As R increases, the amplitude of the curve decreases. Therefore, for a given locking differential design, and with all other factors remaining constant, the frequency of missed engagements can be reduced by increasing R, which theoretically may be accomplished by moving the latch mechanism further outward radially on the differential. However, because to the difficulty of finding sufficient space for the latch mechanism in prior art locking differentials, it has already been customary for the flyweight mechanism and latch mechanism to be placed in an opening defined by the wall of the case, far enough inside the case diameter to permit the latch mechanism to pivot from the operative position to an inoperative position, without any portion of the mechanism moving outside the case diameter.

Accordingly, it is an object of the present invention to provide a latch mechanism for a locking differential which is capable of reducing the amplitude of the "lockout" curve, without the need to increase the case diameter.

It is a more specific object of the present invention to provide a latch mechanism for a locking differential having an increased radius to its center of gravity without causing an increase in the case diameter.

SUMMARY OF THE INVENTION

The above and other objects of the present invention are accomplished by the provision of a differential gear mechanism or the type described, including a lockup means for locking up the differential gear means to retard differentiating action and an actuating means for actuating the lockup means. The lockup means includes clutch means and a cam means, and the actuating means includes retarding means operable to engage the cam means and retard rotation of a portion thereof. The retarding means comprises a flyweight mechanism rotatable about its axis at a speed generally proportional to the level of differentiating action. The flyweight mechanism defines a stop surface movable from a retracted position to an extended position in response to an increase in the level of differentiating action. The actuating means further includes a latch mechanism including a latch member and means biasing the latch member toward an operative position. When the latch member is in the operative position, it is disposed to engage the stop surface, with the stop surface in the extended position. The latch mechanism further includes a weight oppositely disposed from the latch member, about the axis of rotation, the weight being operable to move the latch mechanism in opposition to the biasing means along a straight, generally diametrally-orientated path in response to an increasing rotational speed of the differential gear mechanism. Above a predetermined rotational speed of the mechanism, the weight is operable to move the latch member from its operative position to an inoperative position, incapable of engaging the stop surface of the flyweight mechanism.

DESCRIPTION OF THE PREFERRED EMBODIMENT

Figure 1:
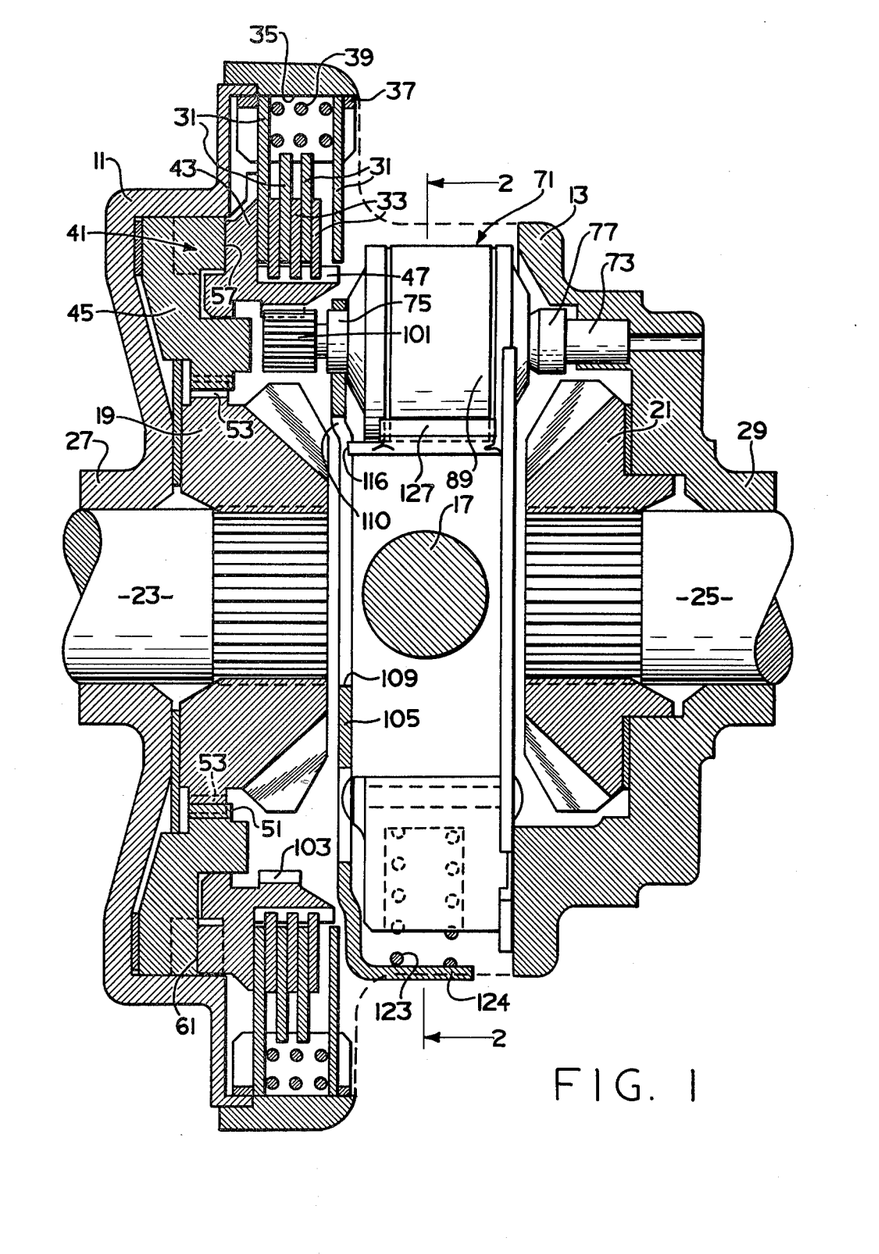
FIG. 1 is an axial cross section of a locking differential gear mechanism made in accordance with the present invention.

Referring now to the drawings, which are not intended to limit the present invention, FIG. 1 is an axial cross section of a differential gear mechanism made in accordance with the present invention. The differential gear mechanism includes a gear case comprising a lefthand casing section 11 and a righthand casing section 13. Torque input to the gear mechanism is typically by means of an input gear (not shown), which may be bolted to the casing section 13.

Disposed within the gear case is a differential gear set including a pair of planet pinions 15 (see FIG. 2), rotatably mounted on a pinion shaft 17 which, in turn, is pinned to the casing section 13. The planet pinions 15 comprise the input gears of the differential gear set and are in meshing engagement with a pair of side gears 19 and 21, which comprise the output gears of the differential gear set. The side gears 19 and 21 are splined to a pair of axle shafts 23 and 25, respectively. The casing sections 11 and 13 include annular hub portions 27 and 29, respectively, on which are mounted the bearing sets (not shown) used to provide rotational support for the differential gear mechanism, relative to the main, outer casing (not shown).

During normal, straight-ahead operation of the vehicle, no differentiating action occurs between the left and right axle shafts 23 and 25, and the pinions 15 do not rotate relative to the pinion shaft 17, such that the casing sections 11 and 13, the pinions 15, and side gears 19 and 21 and the axle shafts 23 and 25 all rotate about the axis of the shafts 23 and 25 as a solid unit.

Under certain operating conditions, such as when the vehicle is turning, or a slight loss of traction occurs, it is permissible for a certain amount of differentiating action to occur between the side gears 19 and 21, up to a predetermined level. Above that predetermined level of differentiating action (e.g., a difference of 100 rpm between the side gears), it is desirable to retard the relative rotation between the gear case and the side gears, to prevent excessive differentiating action.

In order to retard differentiating action, the differential gear mechanism of the present invention is provided with a lockup means for locking up the differential gear set, and an actuating means for actuating the lockup means. In the subject embodiment, the lockup means comprises a clutch mechanism including a plurality of clutch discs 31 and a plurality of clutch discs 33. The casing section 13 defines a plurality of semi-cylindrical openings 35. In the subject embodiment, there are four of the openings 35, and disposed within each opening is a semi-cylindrical guide member 37 which helps to guide the clutch discs 31. Disposed within each of the guide members 37 is a helical compression spring 39 which seats, at its opposite ends, against the lefthand and righthand clutch discs 31. The biasing force exerted by the springs 39 must be sufficient to maintain the clutch discs 31 and 33 in the disengaged condition shown in FIG. 1, in the absence of other forces biasing the clutch discs together.

The lockup means further includes a cam mechanism, generally designated 41. As is well known to those skilled in the locking differential art, one function of the cam mechanism 41 is to effect movement of the clutch pack from the disengaged condition shown in FIG. 1 to an engaged condition. It will become apparent from the subsequent description that, within the scope of the present invention, many different configurations and types of cam mechanism may be utilized. In the subject embodiment, the cam mechanism 41 is of the type illustrated and described in greater detail in copending U.S. application Ser. No. 22,664, filed Mar. 22, 1979, in the name of Edward J. Goscenski, Jr., entitled LOCKING DIFFERENTIAL, and assigned to the assignee of the present invention.

The cam mechanism 41 includes a main cam member 43 and an intermediate cam member 45. The main cam member 43 defines a set of external splines 47, and the clutch discs 33 define a set of internal splines such that the clutch discs 33 are splined to the main cam member 43 for rotation therewith. The intermediate cam member 45 defines a set of straight, internal splines 51 which are in meshing engagement with a set of straight, external splines 53, formed about the outer periphery of the side gear 19. Thus, the intermediate cam member 45 is splined to the side gear 19 for rotation therewith, such that the forces transmitted from the intermediate cam member 45 to the side gear 19 are only rotational, with no substantial axial forces being transmitted to the side gear 19.

As is described in greater detail in the above-referenced copending application, the intermediate cam member 45 defines a plurality of cam ramp surfaces 57, and the main cam member 43 defines a plurality of cam ramp surfaces 61. The relative rotational position of the cam members 43 and 45, wherein the cam ramp surfaces 57 and 61 are in meshing engagement, corresponds to the disengaged condition of the clutch mechanism shown in FIG. 1. During normal, straight-ahead operation of the vehicle, with little or no differentiating action occurring, the cam members 43 and 45 remain in that relative rotational position, and rotate with the side gear 19, at the same rotational speed.

As is also generally well known to those skilled in the art, movement of the clutch mechanism to the engaged condition may be accomplished by retarding rotation of the main cam member 43, relative to the intermediate cam member 45. Such relative rotation between the cam members 43 and 45 will cause "ramping" of the ramp surfaces 57 and 61, resulting in axial movement of the main cam member 43, to the right in FIG. 1. Such movement of the cam member 43 is in opposition to the biasing force of the springs 39. Preferably, the lockup means utilized with the present invention is of the "self-energizing" type, i.e., the coefficient of friction of the discs 31 and 33 and the cam angle (angle of ramp surfaces 57 and 61) are selected such that the cam member 43 would ramp and lock the clutch pack merely as a result of frictional drag between the discs, in the absence of the springs 39.

However, under normal operating conditions, the springs 39 prevent the discs from exerting sufficient drag on the cam member 43 to cause it to ramp. When the retarding torque on the main cam member is sufficient to overcome the force of the springs 39, ramping and locking of the clutch pack will occur. The lockup means will remain actuated (with the differential gear set locked up) until the torque difference across the lockup means is substantially eliminated (e.g., both wheels turning at the same speed, with full traction), at which time the springs disengage the clutch pack.

In order to retard rotation of the main cam member 43, relative to the intermediate cam member 45, the actuating means utilized with the present invention includes a retarding mechanism. In the subject embodiment, the retarding mechanism comprises a flyweight mechanism, generally designated 71. Within the scope of the invention, the flyweight mechanism 71 could have many different configurations, but in the subject embodiment, it is made in accordance with U.S. Pat. Nos. Re. 28,004 and 3,985,045, both of which are assigned to the assignee of the present invention.

Figure 3:
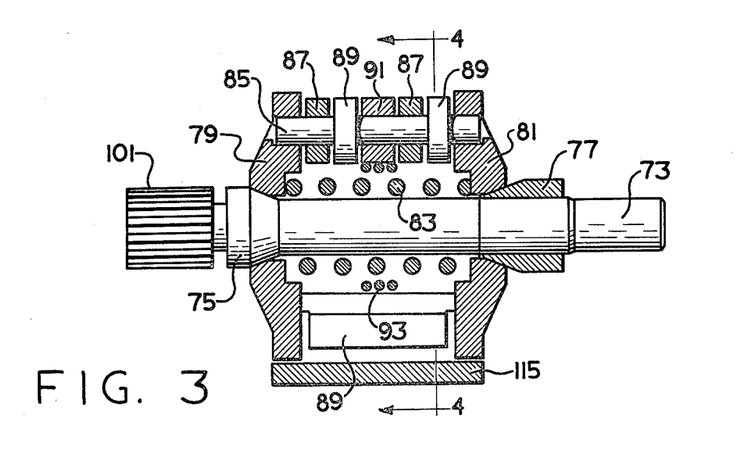
FIG. 3 is an axial cross section of the flyweight mechanism shown in FIG. 1, but on a larger scale than FIG. 1.
Figures 4, 5, 6, 7:
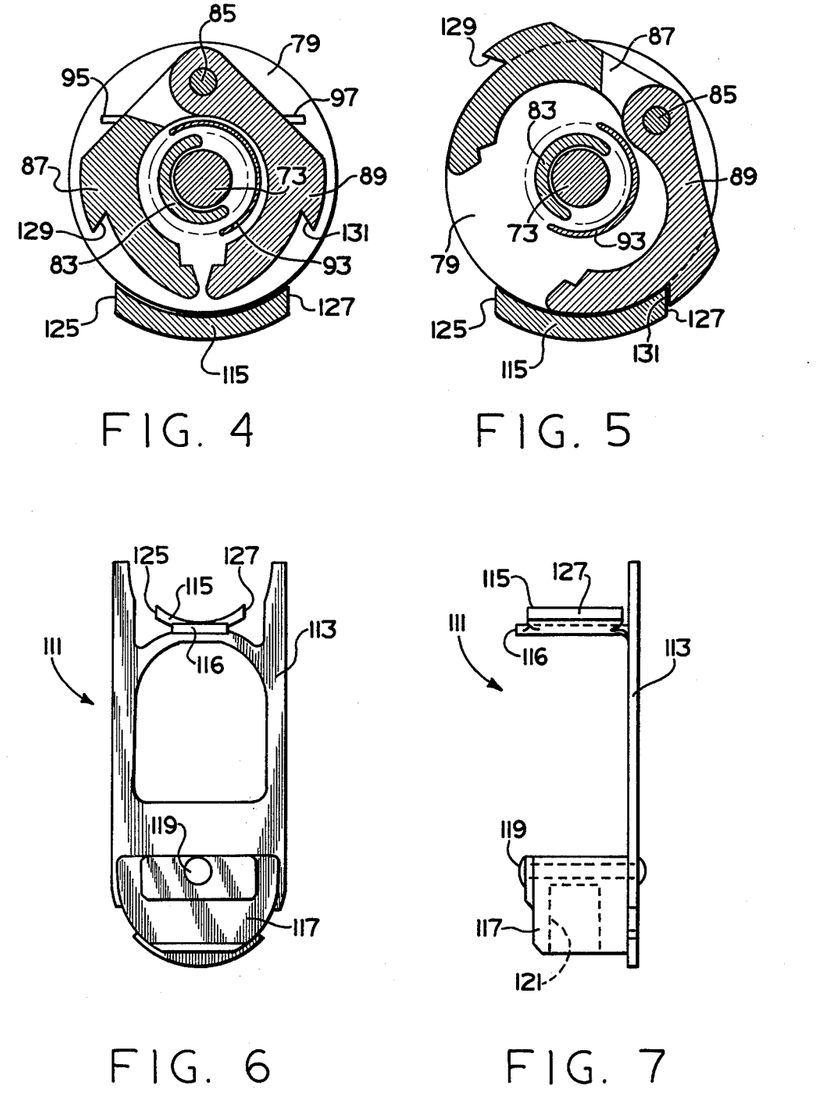
FIG. 4 is a transverse cross section, taken on line 4—4 of FIG. 3, with the flyweight mechanism in the retracted position.
FIG. 5 is a transverse cross section, similar to FIG. 4, with the flyweight mechanism in the extended position.
FIG. 6 is a front elevation of the latch mechanism of the present invention, viewed in the same direction as FIG. 2.
FIG. 7 is a side elevation of the latch mechanism, viewed in the same direction as in FIG. 1.

As may best be seen by viewing FIGS. 3 and 4, in conjunction with FIG. 1, the flyweight mechanism 71 includes a main shaft 73 on which is mounted a pair of cone clutch members 75 and 77. A pair of endcaps 79 and 81 are biased into engagement with the cone clutch members 75 and 77, respectively, by a compression spring 83. Received within cylindrical openings in the endcaps 79 and 81, and supported thereby, is a support shaft 85, and pivotally mounted on the support shaft 85 is a pair of flyweights 87 and 89. Also disposed about the support shaft 85 is a spacer 91, and disposed between the flyweights 87 and 89 is a torsional spring member 93. As may best be seen in FIG. 4, the spring member 93 includes a pair of end portions 95 and 97, which engage the flyweights 87 and 89, respectively, to maintain the flyweights in the retracted position shown in FIG. 4, in the absence of centrifugal force.

Also mounted on the main shaft 73 is an externally-toothed gear member 101 which is in engagement with a set of internal gear teeth 103 formed about the inner periphery of the main cam member 43, as is described in greater detail in the above-referenced copending application.

Figure 2:
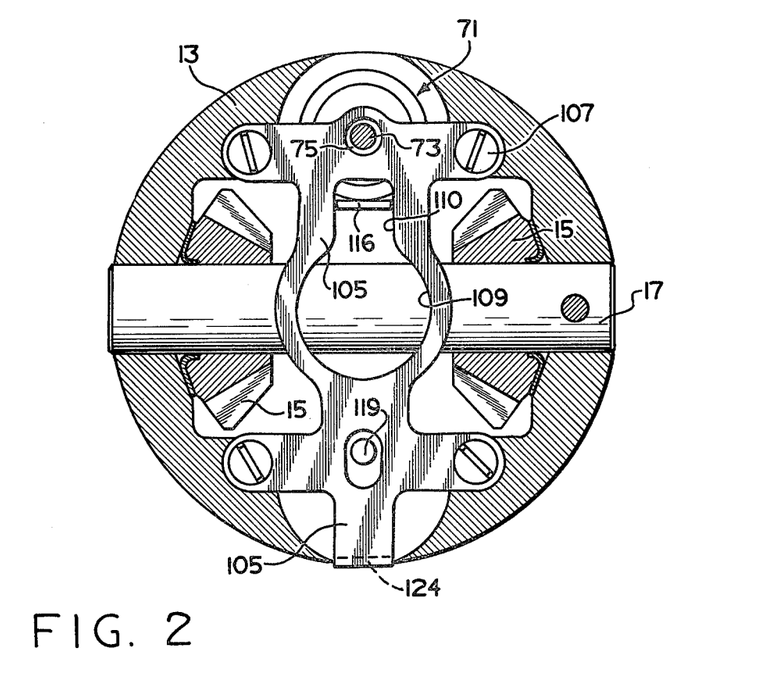
FIG. 2 is a transverse cross section, taken generally along line 2—2 of FIG. 1, but on a smaller scale, and with all of the actuating mechanism of the present invention in place.

As may best be seen in FIGS. 1 and 2, a bracket member 105 is rigidly attached to the casing section 13 by four machine screws 107. The bracked member 105 defines a generally circular central opening 109, and a straight-sided opening 110, disposed above the opening 109 and contiguous therewith. The function of the opening 110 will be described subsequently. The bracket member 105 further defines a circular opening which receives and supports the cone clutch 75 and the main shaft 73 of the flyweight mechanism 71, with the opposite end of the main shaft 73 being rotatably supported by the casing section 13. Therefore, the flyweight mechanism 71 is mounted for rotation about its own axis.

During operation, if differentiating action begins to occur between the axle shafts 23 and 25, and thus between the side gear 19 and the gear case, the cam members 43 and 45 will begin to rotate in unison at a speed different than that of the gear case (including casing section 13). As a result of this speed difference, and the toothed engagement between gear member 101 and gear teeth 103, the flyweight mechanism 71 will begin to rotate about its own axis at a rotational speed which is a function of the level of the differentiating action. As the speed of rotation of the flyweight mechanism 71 increases, centrifugal force causes the flyweights 87 and 89 to move outwardly, in opposition to the force of the spring 93.

In order to retard rotation of the main cam member 43, relative to the intermediate cam member 45, the actuating means of the present invention includes a stop means (or latch means), operable to prevent rotation of the flyweight mechansim 71, when a predetermined level of differentiating action occurs. When rotation of the flyweight mechanism 71 is prevented, the additional retarding force thereby applied to the main cam member 43 is sufficient to overcome the biasing force of the springs 39, resulting in lockup of the clutch pack.

Figure 8:
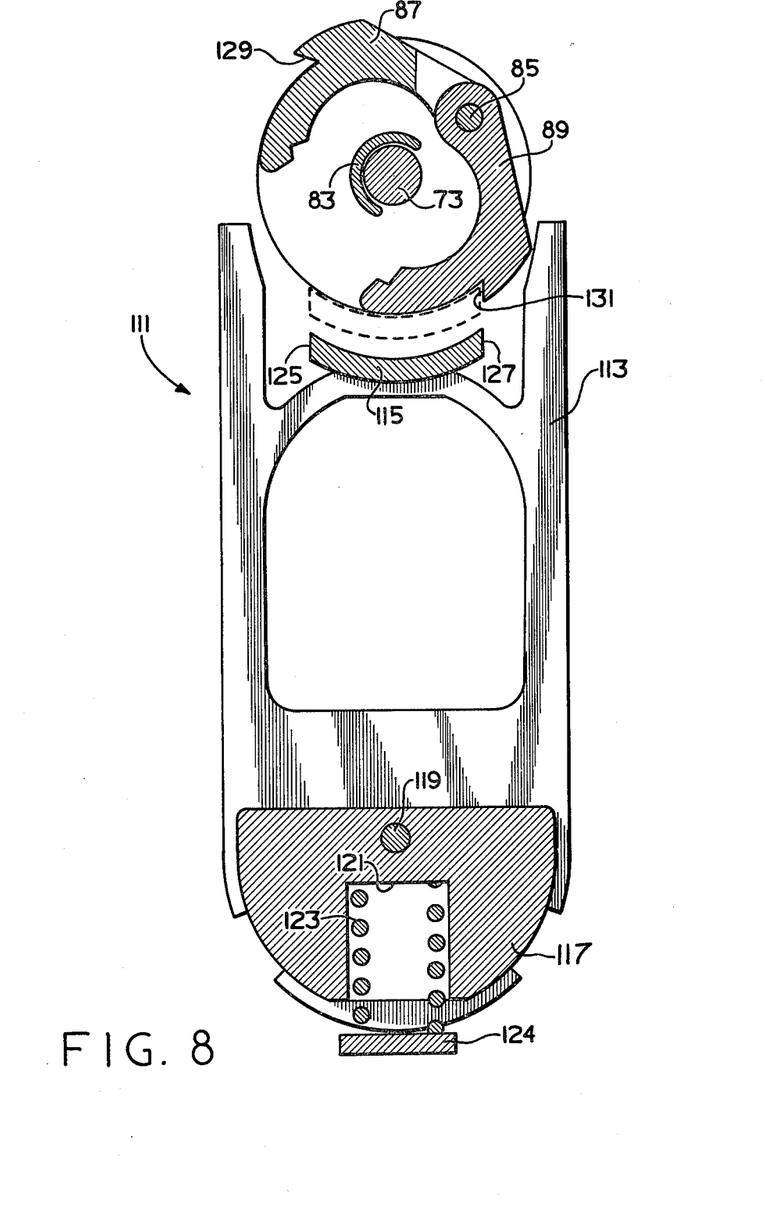
FIG. 8 is a transverse cross section, also taken generally on line 2—2 of FIG. 1, but on a larger scale, and illustrating the inoperative position of the latch mechanism of the present invention.

Referring now primarily to FIGS. 6 and 7, in conjunction with FIG. 1, the stop means or latch means of the present invention comprises a novel latch mechanism, generally designated 111. In the subject embodiment, and by way of example only, the latch mechanism 111 includes a one-piece, stamped frame member 113, including an arcuate latch member 115 which, as may be seen in FIG. 1, extends toward the bracket member 105. The latch member 115 includes a guide tab 116 which is movably disposed (up and down in FIGS. 1 and 2) within the opening 110, to help maintain orientation of the latch mechanism 111 relative to the bracket member 105, during operating conditions which will be described subsequently. The latch mechanism 111 further includes a weighted member 117 which is attached to the frame member 113 by means of a rivet 119. The weighted member 117 defines a cylindrical bore 121 within which is seated a compression spring 123 (FIGS. 1 and 8). The other end of the spring 123 is seated against a lower, L-shaped portion 124 of the bracket member 105. Referring now to FIGS. 4 and 5, in conjunction with FIGS. 6 and 7, the latch member 115 includes a pair of oppositely disposed latch surfaces 125 and 127 which are effective to prevent rotation of the latch mechanism 71 in a manner to be described subsequently.

Under normal operating conditions, with little or no differentiating action occurring, the torsion spring 93 is effective to maintain the flyweights 87 and 89 in the retracted position in FIG. 4. With the vehicle moving at a relatively slow speed (e.g., below about 20 mph), the compression spring 123 biases the latch mechanism 111 toward the flyweight mechansim 71, such that the latch member 115 is in the position shown in FIGS. 3 and 4, either touching the end caps 79 and 81 or being closely spaced apart therefrom.

When the level of differentiating action exceeds a predetermined limit, centrifugal force causes the flyweights 87 and 89 to overcome the biasing force of the spring 93 and move outwardly to the position shown in FIG. 5. The flyweights 87 and 89 define stop surfaces 129 and 131, respectively, which are in the extended position, with the flyweights disposed outwardly as shown in FIG. 5. Depending upon the direction of rotation of the latch mechanism 71, which in turn depends upon the direction of relative rotation between the side gears 19 and 21, one of the stop surfaces will engage one of the latch surfaces, preventing further rotation of the flyweight mechanism 71. For example, with the flyweight mechanism 71 rotating clockwise as shown in FIG. 5, the stop surface 131 defined by the flyweight 89 engages the latch surface 127 on the latch member 115. If the latch mechanism 71 were rotating counterclockwise, with the stop surfaces in the extended position, the stop surface 129 defined by the flyweight 87 would engage the latch surface 125.

As is well known to those skilled in the locking differential art, it is considered desirable that the stop means, such as the latch mechanism 111 of the present invention, be operable to prevent rotation of the flyweight mechanism 71 only up to a predetermined rotational speed of the differential gear mechanism, corresponding to a predetermined vehicle speed. For example, at vehicle speeds below about 20 mph, the latch mechanism 111 will operate as described above. However, at vehicle speeds of about 20 mph or greater, it is generally considered unnecessary, or even undesirable, by those skilled in the art to lockup the differential gear set, regardless of the level of differentiating action. Accordingly, the latch mechanism 111 of the present invention is effective to be deactivated or "locked out" above a predetermined rotational speed of the differential gear mechanism.

Referring now primarily to FIG. 8, the operation of the present invention above the predetermined rotational speed is illustrated. With the occurrence of a sufficient level of differentiating action, the flyweights 87 and 89 move outwardly, moving the stop surfaces 129 and 131 to their extended positions, the same as in FIG. 5. However, with the differential gear mechanism rotating in excess of the predetermined speed, centrifugal force acts on the weighted member 117 and causes movement of the entire latch mechanism, in opposition to the biasing force of the spring 123. As illustrated in FIG. 8, because the weighted member 117 is oppositely disposed from the latch member 115, about the axis of rotation of the mechanism, movement of the weighted member 117 outwardly, as a result of centrifugal force, causes movement of the latch member 115 inwardly. An important feature of the present invention, also illustrated in FIG. 8, is that the movement of the latch mechanism 111 is along a path which is straight and which is generally diametrally-oriented, rather than being pivotal. As a result, substantially the entire mass of the weighted member 117 is directly effected by centrifugal force.

Referring still to FIG. 8, it may be seen that the movement of the latch mechanism 111, as a result of centrifugal force acting on the weighted member 117, moves the latch member 115 from its operative position (shown by a dotted line in FIG. 8, corresponding to the FIG. 5 position), to an inoperative position. In the operative position illustrated in FIG. 8, rotation of the flyweight mechanism 71 does not cause engagement of either of the stop surfaces 129 and 131 by its respective latch surface 125 and 127.

What is claimed is:

1. A differential gear mechanism comprising a gear case defining a gear chamber, a differential gear means disposed in said gear chamber, said differential gear means including at least one input gear and a pair of output gears defining an axis of rotation, lockup means for locking up said differential means to retard differentiating action, and actuating means for actuating said lockup means, said lockup means including clutch means operable between an engaged condition, effective to retard relative rotation between said gear case and said output gears, and a disengaged condition, said lockup means further including cam means operable to effect said engaged condition of said clutch means, said actuating means including retarding means operable to engage said cam means and retard rotation of a portion of said cam means, said retarding means comprising a flyweight mechanism rotatable about its axis at a speed generally proportional to the level of differentiating action and defining a stop surface movable from a retracted position to an extended position in response to an increase in the level of differentiating action, said actuating means further including a latch mechanism including a latch member and means biasing said latch member toward an operative position, said latch member, in said operative position being disposed to engage said stop surface, when said stop surface is in said extended position, said latch mechanism further including a weight oppositely disposed from said latch member, about said axis of rotation, said weight being operable to move said latch mechanism, in opposition to said biasing means, along a straight, generally diametrally-oriented path in response to increasing rotational speed of said differential gear mechanism, to move said latch member from said operative position to an inoperative position, above a predetermined rotational speed of said differential gear mechanism.

2. A differential gear mechanism as claimed in claim 1 wherein said flyweight mechanism includes first and second flyweights mounted for pivotal movement about a pivot axis radially displaced from said axis of rotation of said flyweight mechanism.

3. A differential gear mechanism as claimed in claim 2 wherein said stop surface comprises a first stop surface defined by said first flyweight and said second flyweight defines a second stop surface.

4. A differential gear mechanism as claimed in claim 3 wherein said latch member defines first and second latch surfaces, and, when said latch member is in said operative position, said first latch surface being disposed to engage said first stop surface when said flyweight mechanism is rotating in a first direction and said first stop surface is in said extended position, and said second latch surface being disposed to engage said second stop surface when said flyweight mechanism is rotating in a second direction and said second stop surface is in extended surface.

5. A differential gear mechanism as claimed in claim 1 wherein said latch mechanism includes an elongated frame member, said latch member and said weight being rigidly attached to said frame member to provide a fixed spatial relationship between said latch member and said weight.

6. A differential gear mechanism as claimed in claim 1 wherein said latch mechanism includes guide means, and said actuating means further includes a bracket member fixedly attached to said gear case and including guide-receiving means adapted to receive said guide means for movement therein during movement of said latch member between said operative and said inoperative positions.

7. A differential gear mechanism as claimed in claim 6 wherein said bracket member includes means defining a first seat for said means biasing said latch member.

8. A differential gear mechanism as claimed in claim 7 wherein said means defining a seat comprises a terminal portion of said bracket member being disposed radially outwardly from said weight, said weight including means defining a second seat for said means biasing said latch member.

9. A differential gear mechanism as claimed in claim 3 wherein said latch member is generally arcuate, is disposed radially inwardly from said flyweight mechanism, and is closely spaced apart therefrom when said latch member is in said operative position.

10. A differential gear mechanism as claimed in claim 1 wherein said axis of rotation of said flyweight mechanism is substantially parallel to said axis of rotation of said output gears, and said weight defines a center of gravity disposed approximately on a straight line intersecting said axis of rotation of said flyweight mechanism and said output gears.

11. A differential gear mechanism as claimed in claim 10 wherein said latch member defines first and second latch surfaces oppositely and approximately equally disposed about said straight line containing said center of gravity and intersecting said axes of rotation.

12. A differential gear mechanism comprising a gear casing defining a gear chamber, differential gear means disposed in said gear chamber, said differential gear means including at least one input gear and a pair of output gears defining an axis of rotation, lockup means for locking up said differential gear means to regard differentiating action, and actuating means for actuating said lockup means, said lockup means including clutch means operable between an engaged condition, effective to retard relative rotation between said gear case and said output gears, and a disengaged condition, said lockup means further including cam means operable to effect said engaged condition of said clutch means, said cam means including one cam member operable to rotate with one of said output gears and another cam member associated with said clutch means, said actuating means including retarding means operable to engage said another cam member and retard rotation thereof, said retarding means comprising a flyweight mechanism rotatable about an axis generally parallel to the axis of rotation of said output gears, said flyweight mechanism including first and second flyweights mounted for pivotal movement about a pivot axis disposed radially outwardly from said axis of said flyweight mechanism, said first and second flyweights defining first and second stop surfaces, respectively, being movable from a retracted position to an extended position in response to increasing centrifugal force exerted thereon, said actuating means further including a latch mechanism comprising a frame member defining an axis, said axis being generally diametrally-oriented and intersecting said axes of rotation of said output gears and said flyweight mechanism, said latch mechanism further including a latch member defining first and second latch surfaces oppositely and approximately equally disposed about said latch mechanism axis and a weighted portion defining a center of gravity disposed on said latch mechanism axis, and oppositely disposed from said latch member about said axis of rotation of said output gears, said actuating means further including means biasing said latch mechanism toward an operative position whereby one of said first and second stop surfaces are engaged by the respective one of said first and second latch surfaces, when said stop surfaces are in said extended position, said weighted portion being operable to move said latch mechanism along its axis, in opposition to said biasing means, to move said latch mechanism toward an inoperative position, above a predetermined rotational speed of said differential gear mechanism.

* * * * *